(12) United States Patent
Zhang et al.

(10) Patent No.: US 12,335,970 B2
(45) Date of Patent: Jun. 17, 2025

(54) APPARATUS AND METHOD OF JOINT SEARCH SPACE SET FOR ENHANCED PDCCH TRANSMISSION WITH MULTIPLE BEAMS FROM MULTIPLE TRPS

(71) Applicant: Lenovo (Beijing) Ltd., Beijing (CN)

(72) Inventors: Yi Zhang, Chao Yang District (CN); Chenxi Zhu, Haidian District (CN); Bingchao Liu, Changping District (CN); Wei Ling, Changping (CN)

(73) Assignee: Lenovo (Beijing) Ltd., Beijing (CN)

( * ) Notice: Subject to any disclaimer, the term of this patent is extended or adjusted under 35 U.S.C. 154(b) by 334 days.

(21) Appl. No.: 17/797,829

(22) PCT Filed: Feb. 7, 2020

(86) PCT No.: PCT/CN2020/074506
§ 371 (c)(1),
(2) Date: Aug. 5, 2022

(87) PCT Pub. No.: WO2021/155573
PCT Pub. Date: Aug. 12, 2021

(65) Prior Publication Data
US 2023/0276451 A1   Aug. 31, 2023

(51) Int. Cl.
*H04W 72/23* (2023.01)
*H04W 72/566* (2023.01)

(52) U.S. Cl.
CPC ......... *H04W 72/23* (2023.01); *H04W 72/566* (2023.01)

(58) Field of Classification Search
CPC ............... H04W 72/23; H04W 72/566; H04W 72/232; H04L 1/0046; H04L 1/0053;
(Continued)

(56) References Cited

U.S. PATENT DOCUMENTS

2018/0042028 A1   2/2018  Nam et al.
2019/0191360 A1*  6/2019  Sun ..................... H04L 5/0051
(Continued)

FOREIGN PATENT DOCUMENTS

CN   110138500 A    8/2019
CN   110536451     12/2019
(Continued)

OTHER PUBLICATIONS 20918012.4 , "Extended European Search Report", EP Application No. 20918012.4, Oct. 9, 2023, 12 pages.
(Continued)

*Primary Examiner* — Candal Elpenord
(74) *Attorney, Agent, or Firm* — FIG. 1 Patents

(57) ABSTRACT

Apparatus and methods of joint search space set for enhanced PDCCH transmission with multiple beams from multiple TRPs are disclosed. The apparatus includes: a processor that generates a plurality of versions of Downlink Control Information (DCI) for transmission from a plurality of transmitting-receiving identities with a plurality of Control Resource Sets (CORESETs), each CORESET being transmitted from one of the transmitting-receiving identities; and configures an Information Element (IE) indicating a joint search space set for the DCI, wherein the joint search space set comprises a plurality of component search space sets; and a transmitter that transmits the DCI and the IE using the plurality of transmitting-receiving identities; wherein each one of the component search space sets is configured for monitoring and detecting one DCI version.

20 Claims, 5 Drawing Sheets

(58) Field of Classification Search
CPC ............... H04L 1/0072; H04L 1/0057; H04L 5/0035; H04L 5/0094; H04L 5/0053; H04L 5/0064
USPC .................................................. 370/329–330
See application file for complete search history.

(56) References Cited

U.S. PATENT DOCUMENTS

| | | | | |
|---|---|---|---|---|
| 2020/0404690 | A1* | 12/2020 | Lee ..................... | H04W 24/10 |
| 2021/0144717 | A1* | 5/2021 | Tsai ..................... | H04W 8/24 |
| 2021/0204309 | A1* | 7/2021 | Babaei ................ | H04W 36/0061 |
| 2021/0219313 | A1* | 7/2021 | Matsumura .......... | H04W 72/23 |
| 2022/0158783 | A1* | 5/2022 | Matsumura .......... | H04L 5/0032 |

FOREIGN PATENT DOCUMENTS

| | | |
|---|---|---|
| EP | 3944688 A1 | 1/2022 |
| WO | 2018141246 A1 | 8/2018 |

OTHER PUBLICATIONS

NTT Docomo, Inc., "PDCCH enhancements for URLLC", 3GPP TSG RAN WG1 Ad-Hoc Meeting 1901, R1-1900969, Taipei [retrieved Nov. 22, 2023]. Retrieved from the Internet <https://www.3gpp.org/ftp/tsg_ran/WG1_RL1/TSGR1_AH/NR_AH_1901/Docs>, Jan. 2019, 10 pages.

Qualcomm Incorporated, "Multi-TRP Enhancements", 3GPP TSG-RAN WG1 Meeting #98bis, R1-1911126, Chongqing, China [retrieved Nov. 22, 2023]. Retrieved from the Internet <https://www.3gpp.org/ftp/tsg_ran/WG1_RL1/TSGR1_98b/Docs>, Oct. 2019, 26 pages.

Samsung, "Enhancements on Multi-TRP/Panel Transmission", 3GPP TSG RAN WG1 Meeting #98bis, R1-1910493, Chongqing, China [retrieved Nov. 22, 20232]. Retrieved from the Internet <https://www.3gpp.org/ftp/tsg_ran/WG1_RL1/TSGR1_98b/Docs>, Oct. 2019, 17 pages.

Mediatek, "Enhancements on multi-TRP/panel transmission", 3GPP TSG RAN WG1 #99, R1-1912134, Reno, USA [retrieved Aug. 23, 2022]. Retrieved from the internet <https://www.3gpp.org/ftp/tsg_ran/WG1_RL1/TSGR1_99/Docs?sortby=sizerev>., Nov. 2019, 8 Pages.

NTT Docomo, Inc, "Enhancements on multi-TRP/panel transmission", 3GPP TSG RAN WG1 #98bis, R1-1911184, Chongqing, China [retrieved Aug. 23, 2022]. Retrieved from the internet <https://www.3gpp.org/ftp/tsg_ran/WG1_RL1/TSGR1_98b/Docs>., Oct. 2019, 32 Pages.

PCT/CN2020/074506, "International Preliminary Report on Patentability", PCT Application No. PCT/CN2020/074506, Aug. 18, 2022, 5 pages.

PCT/CN2020/074506, "International Search Report and Written Opinion", PCT Application No. PCT/CN2020/074506, Nov. 11, 2020, 6 pages.

202080095461.5, "Foreign Office Action", CN Application No. 202080095461.5, Jul. 4, 2024, 11 pages.

"Notification to Grant Patent Right for Invention", CN Application No. 202080095461.5, Jan. 28, 2025, 4 pages.

"Foreign Office Action", EP Application No. 20918012.4, Dec. 12, 2024, 11 pages.

* cited by examiner

APPARATUS AND METHOD OF JOINT SEARCH SPACE SET FOR ENHANCED PDCCH TRANSMISSION WITH MULTIPLE BEAMS FROM MULTIPLE TRPS

FIELD

The subject matter disclosed herein relates generally to wireless communication and more particularly relates to, but not limited to, apparatus and methods of joint search space set for enhanced Physical Downlink Control Channel (PDCCH) transmission with multiple beams from multiple Transmit and Receive Points (TRPs).

BACKGROUND

The following abbreviations and acronyms are herewith defined, at least some of which are referred to within the specification.

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Equipment (UE), Network Equipment (NE), Radio Access Technology (RAT), Receive or Receiver (RX), Transmit or Transmitter (TX), Acknowledgement (ACK), Negative Acknowledgement (NACK), Physical Downlink Control Channel (PDCCH), Physical Downlink Shared Channel (PDSCH), Bandwidth Part (BWP), Control Channel Element (CCE), Control Resource Set (CORESET), Common Search Space (CSS), Downlink Control Information (DCI), Frequency Division Multiple Access (FDMA), Identification (ID), Information Element (IE), Subcarrier Spacing (SCS), Single Frequency Network (SFN), Transmit Receive Point (TRP), UE-specific Search Space (USS), Frequency Range 1 (FR1), Frequency Range 2 (FR2), Synchronization Signal (SS).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission can be from multiple TRPs and thus resources for PDCCH transmission are increased. Further, the spatial diversity may be exploited in addition to the time-frequency diversity. There are many candidate schemes to exploit the additional resources to improve PDCCH transmission reliability and robustness. One of the candidate schemes is that one DCI is transmitted with multiple versions, where each version is transmitted on a Control Resource Set (CORESET) from each TRP. To better support this kind of PDCCH transmission schemes, enhancement on search space set and related UE detection behavior is desired.

SUMMARY

Apparatus and methods of joint search space set for enhanced PDCCH transmission with multiple beams from multiple TRPs are disclosed.

According to a first aspect, there is provided an apparatus, including: a processor that generates a plurality of versions of Downlink Control Information (DCI) for transmission from a plurality of transmitting-receiving identities with a plurality of Control Resource Sets (CORESETs), each CORESET being transmitted from one of the transmitting-receiving identities; and configures an Information Element (IE) indicating a joint search space set for the DCI, wherein the joint search space set comprises a plurality of component search space sets; and a transmitter that transmits the DCI and the IE using the plurality of transmitting-receiving identities; wherein each one of the component search space sets is configured for monitoring and detecting one DCI version.

According to a second aspect, there is provided an apparatus, including: a receiver that receives Downlink Control Information (DCI) with a plurality of versions from a plurality of transmitting-receiving identities with a plurality of Control Resource Sets (CORESETs), each CORESET being transmitted from one of the transmitting-receiving identities; and receives an Information Element (IE) indicating a joint search space set for the DCI, wherein the joint search space set comprises a plurality of component search space sets; and a processor that decodes the DCI by blindly detecting Physical Downlink Control Channel (PDCCH) candidates in the joint search space set based on the IE; wherein each one of the component search space sets is configured for monitoring and detecting one DCI version.

According to a third aspect, there is provided a method, including: generating, by a processor, a plurality of versions of Downlink Control Information (DCI) for transmission from a plurality of transmitting-receiving identities with a plurality of Control Resource Sets (CORESETs), each CORESET being transmitted from one of the transmitting-receiving identities; configuring, by the processor, an Information Element (IE) indicating a joint search space set for the DCI, wherein the joint search space set comprises a plurality of component search space sets; and transmitting, by a transmitter, the DCI and the IE using the plurality of transmitting-receiving identities; wherein each one of the component search space sets is configured for monitoring and detecting one DCI version.

According to a fourth aspect, there is provided a method, including: receiving, by a receiver, Downlink Control Information (DCI) with a plurality of versions from a plurality of transmitting-receiving identities with a plurality of Control Resource Sets (CORESETs), each CORESET being transmitted from one of the transmitting-receiving identities; and receiving, by the receiver, an Information Element (IE) indicating a joint search space set for the DCI, wherein the joint search space set comprises a plurality of component search space sets; and decoding, by a processor, the DCI by blindly detecting Physical Downlink Control Channel (PDCCH) candidates in the joint search space set based on the IE; wherein each one of the component search space sets is configured for monitoring and detecting one DCI version.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
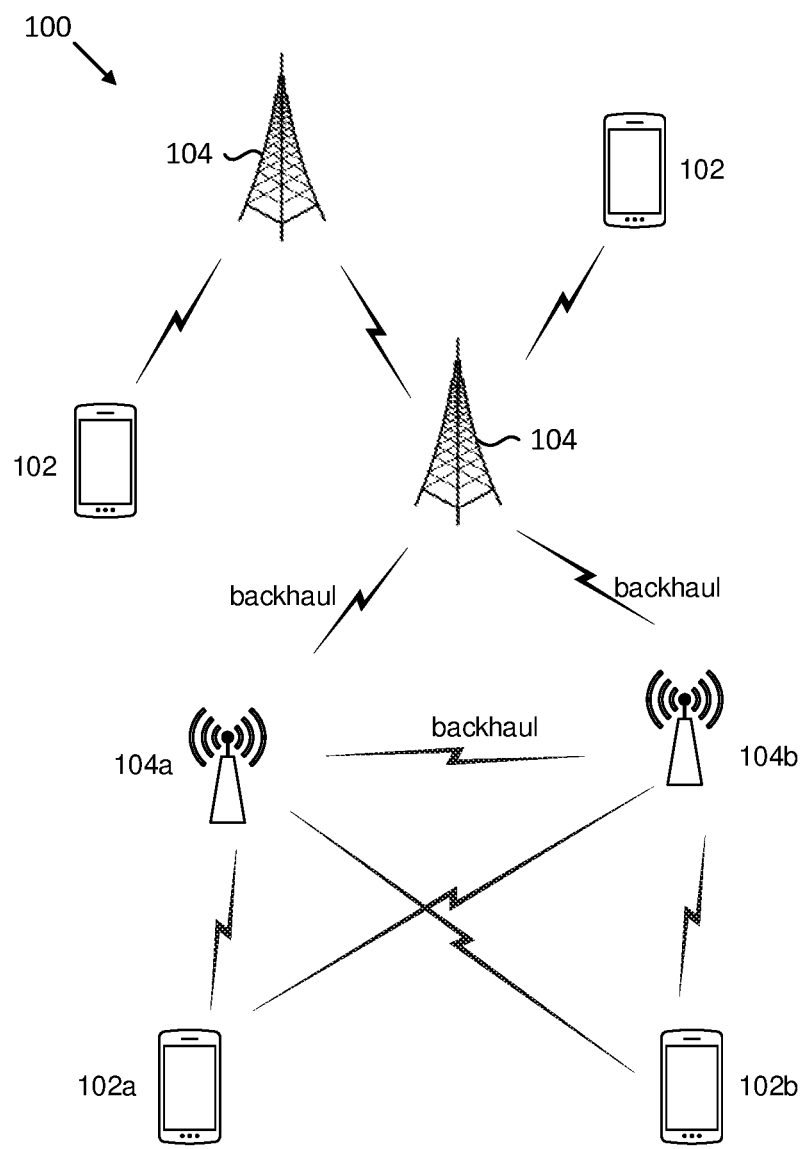
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B", which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

Figure 2:
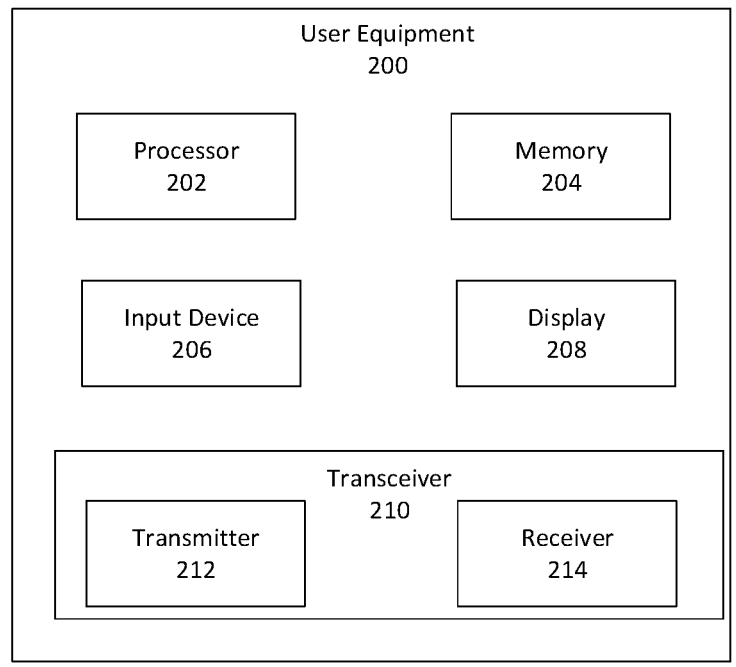
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
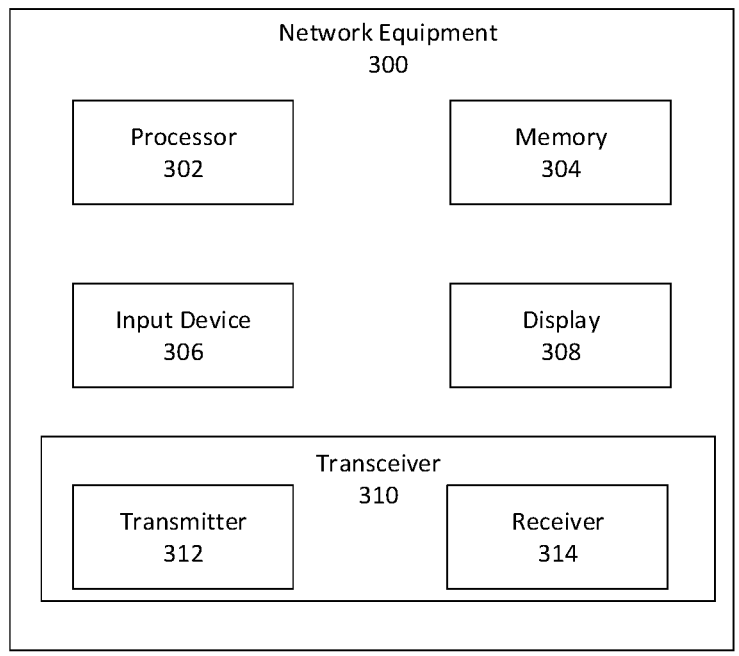
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

In the current NR system, the PDCCH-Config Information Element (IE) is used to configure UE specific PDCCH parameters such as control resource sets (CORESETs), search space sets and additional parameters for acquiring the PDCCH.

In one PDCCH-Config, at most 3 CORESETs and at most 10 search space sets are supported per Bandwidth Part (BWP) for serving cell. For multi-PDCCH based multi-TRP operation, the maximum number of CORESETs per "PDCCH-Config" may be increased to 5 based on UE capability according to agreements in RAN1 #97 meeting.

The IE SearchSpace defines how and/or where to search for PDCCH candidates. Each search space set is associated with one ControlResourceSet. The time domain behavior for monitoring is defined by parameters monitoringSlotPeriodicity-AndOffset, duration and monitoringSymbolsWithinSlot. The supported aggregation levels and the candidate number for each aggregation level can be flexibly configured. The related SearchSpace information element in the technical specification TS 38.331 is described as follows. A PDCCH is monitored in one search space set which is linked with one CORESET. There is no more information among multiple search space sets. Thus, with the IE SearchSpace described in TS 38.331, it cannot support joint detection for repeated transmission or multiple DCI version transmission for one PDCCH.

```
Search Space ::=                          SEQUENCE {
    search SpaceId                            Search SpaceId,
    controlResourceSetId                      ControlResourceSetId
OPTIONAL,    -- Cond SetupOnly
    monitoringSlotPeriodicityAndOffset        CHOICE {
        sl1                                       NULL,
        sl2                                       INTEGER (0..1),
        ...
    }
OPTIONAL,    -- Cond Setup
    duration                                  INTEGER (2..2559)
OPTIONAL,    -- Need R
    monitoringSymbolsWithinSlot               BIT STRING (SIZE (14))
OPTIONAL,    -- Cond Setup
    nrofCandidates                            SEQUENCE {
        aggregationLevel1                         ENUMERATED {n0, n1, n2, n3, n4, n5, n6,
n8},
        aggregationLevel2                         ENUMERATED {n0, n1, n2, n3, n4, n5, n6,
n8},
        aggregationLevel4                         ENUMERATED {n0, n1, n2, n3, n4, n5, n6,
n8},
        aggregationLevel8                         ENUMERATED {n0, n1, n2, n3, n4, n5, n6,
n8},
        aggregationLevel16                        ENUMERATED {n0, n1, n2, n3, n4, n5, n6,
n8}
    }
OPTIONAL,    -- Cond Setup
    searchSpaceType                           CHOICE {
        common                                    SEQUENCE {
            ...
OPTIONAL,    -- Need R
        },
        ue-Specific                               SEQUENCE {
            dci-Formats                               ENUMERATED { formats0-0-And-1-0,
formats0-1-And-1-1} ,
            ...
        }
    }
OPTIONAL    -- Cond Setup
}
```

For multi-PDCCH based multi-TRP operation, PDCCH can only be supported by single TRP transmission or multiple TRP transmission similar as SFN (Single Frequency Network) transmission. For PDSCH transmission from multiple TRPs, multiple CORESETs may be configured for multiple DCIs transmission. Similar as PDSCH, multiple CORESETs may be used for one PDCCH transmission. According to search space set configuration defined in Release 15, one search space set is associated with one CORESET, thus it is not possible to support using one search space set to monitor one PDCCH transmitted from multiple CORESETs. In this disclosure, a joint search space set is proposed to support PDCCH transmission from multiple TRPs.

In one example, the maximum number of monitored PDCCH candidates, $M_{PDCCH}^{max,slot,\mu}$, for a Downlink (DL) BWP with Subcarrier Spacing (SCS) configuration $\mu$ for a UE per slot for operation with a single serving cell is defined in Table 1 below. The maximum number of non-overlapped CCEs, $C_{PDCCH}^{max,slot,\mu}$, for a DL BWP with SCS configuration $\mu$ that a UE is expected to monitor the corresponding PDCCH candidates per slot for operation with a single serving cell is defined in Table 2 below. For multiple DCI based multiple TRP/panel transmission, a UE can support and report R with range of [1 2] by UE capability signaling.

TABLE 1

Maximum number $M_{PDCCH}^{max,slot,\mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

TABLE 2

Maximum number $C_{PDCCH}^{max,slot,\mu}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

PDCCH overbooking is a process that drops non-overlapped CCE and/or PDCCH candidates until the non-overlapped CCE and/or PDCCH candidate limits are met. The mapping/dropping rule for UE-specific Search Space (USS) PDCCH candidates may be based on the search space ID. A higher priority is put or set for a search space set with a lower ID.

Figure 4:
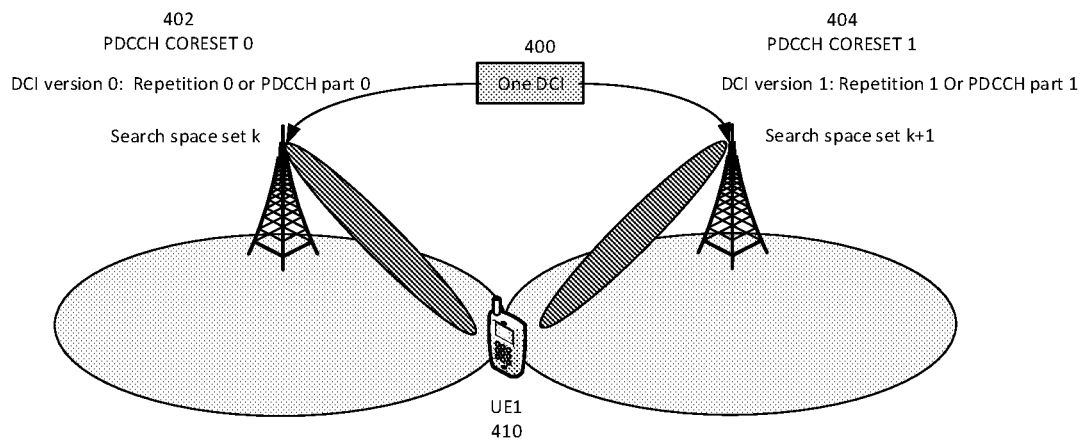
FIG. 4 is a schematic diagram illustrating an example of one DCI transmission with multiple DCI versions from multiple TRPs in accordance with some implementations of the present disclosure.

FIG. 4 is a schematic diagram illustrating an example of one DCI transmission with multiple DCI versions from multiple TRPs. In this example, two TRPs 402 and 404 are used for transmission of one DCI 400 to a UE 410. The DCI 400 is transmitted with multiple DCI versions, i.e. DCI version 0 and DCI version 1, each version being transmitted on a corresponding CORESET, i.e. PDCCH CORESET 0 and PDCCH CORESET 1, from each TRP. The DCI versions may be a simply repeated version or a part of polar coding bits. For example, the DCI version 0 may be repetition 0 or PDCCH part 0, and the DCI version 1 may be repetition 1 or PDCCH part 1.

A joint search space set is configured for the DCI detection which may consist of multiple component search space sets. In this example, the joint search space set consists of component search space set k and component search space set k+1. The component search space set with the first monitoring, i.e., component search space set k, is defined as the anchor search space set. The other search space set in the joint search space, i.e., component search space set k+1, is associated with the anchor search space set. Here, one search space set is used for monitoring transmission of one DCI version and their linkage may be fixed or predefined. That is, each one of the component search space sets is configured for monitoring and detecting one DCI version. For the joint search space set, the resource mapping/dropping rule for PDCCH candidates is putting or setting the same priority for all the component search space sets. Especially, the higher priority may be set for the joint search space set compared with other normal UE specific search space sets. The blind detection behavior may be aligned between gNB and UE with the assistance of signaling indication based on UE capability reporting. For joint decoding, special configurations on component search space sets and candidate combination are proposed to reduce the blind detection complexity.

Since a DCI is transmitted with multiple versions from multiple TRPs, a UE may monitor all the versions and make detection based on all the monitored transmission versions. In the joint search space set which consists of multiple component search space sets, one of the component search space sets is an anchor search space set, and other component search space sets are associated with it, namely associated search space sets. A field associatedSearchSpaceID may be introduced in IE SearchSpace of the anchor search space set. Other component search space IDs associated are included in this field, as shown below.

```
-- TAG-SEARCHSPACE-START
SearchSpace ::=                                         SEQUENCE {
    searchSpaceId                                           Search SpaceId,
    controlResourceSetId                                    ControlResourceSetId
OPTIONAL,    -- Cond SetupOnly
    associatedSearchSpaceID                                 SEQUENCE (SIZE
(1..maxNrofassociatedSearchSpaceSets)) OF                   Search SpaceId
OPTIONAL,    -- Cond Setup
    monitoringSlotPeriodicityAndOffset                      CHOICE { ...
    }
OPTIONAL,    -- Cond Setup
    duration                                                INTEGER (2..2559)
OPTIONAL,    -- Need R
    monitoringSymbolsWithinSlot                             BIT STRING (SIZE (14))
OPTIONAL,    -- Cond Setup
    nrofCandidates                                          SEQUENCE {
    ...
    }
OPTIONAL,    -- Cond Setup
    searchSpaceType                                         CHOICE {
    }
OPTIONAL    -- Cond Setup
}
```

This shows an exemplary configuration of the anchor search space set. The additional filed associatedSearchSpaceID is conditional introduced only when this search space set is an anchor search set. The maximum number of associated search space sets equals to the maximum number of component search space sets minus one.

For this configuration, it is possible to reuse the anchor search space ID, that is the ID of the joint search space set being the ID of the anchor search space set, or define (i.e., specifically assign) a new search space ID for the joint search space set, that is a specifically assigned ID. If the new search space ID is imported, it may be defined as jointsearchSpaceID as an additional optional field.

The monitoring behaviors for each component search space set may be defined according to the corresponding configurations. Some of them may be the same between component search space sets such as the time domain configuration for monitoring. Some of them may be jointly designed and configured such as the aggregation levels and the number of candidates.

Figure 5:
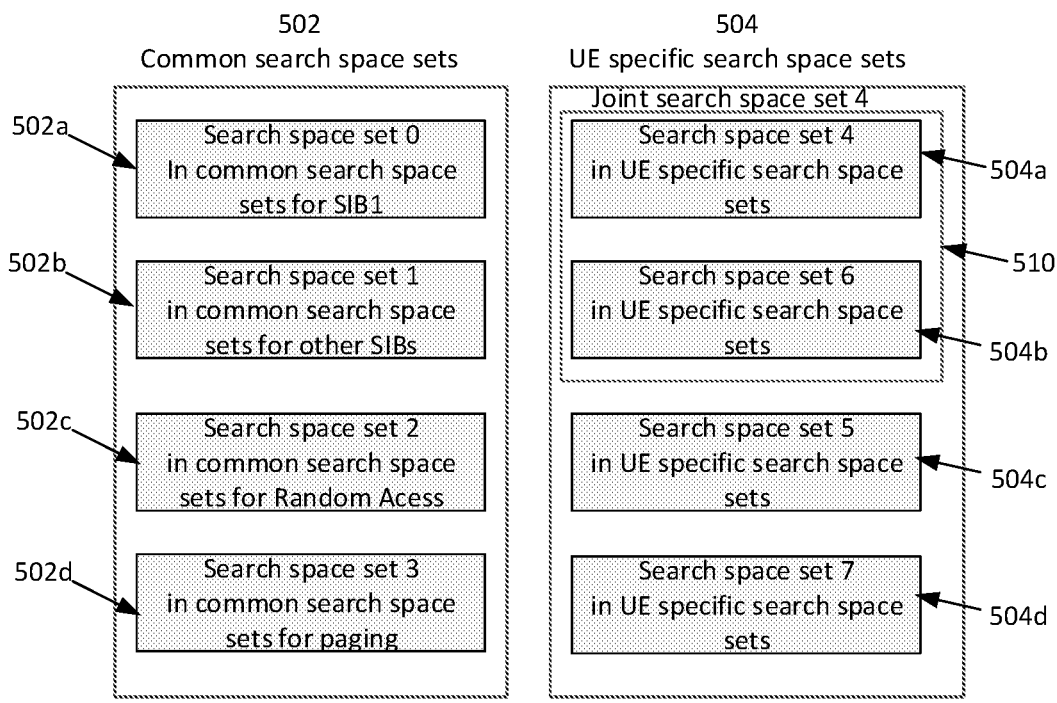
FIG. 5 is a schematic diagram illustrating an example of a priority mapping scheme of search space sets in accordance with some implementations of the present disclosure.

FIG. 5 is a schematic diagram illustrating an example of a priority mapping scheme of search space sets. For monitored PDCCH candidates and non-overlapping CCEs, a mapping/dropping rule may be defined for the case that the number of monitored PDCCH candidates or non-overlapping CCEs exceeds the corresponding maximum supported number of candidates or non-overlapping CCEs.

For example, the maximum supported number of candidates or non-overlapping CCEs may be determined based on the corresponding maximum number defined in the technical specification TS 38.213 for single TRP transmission, or a reported R for multiple DCI based multiple TRP/panel transmission by UE capability signaling.

The counting scheme for monitored PDCCH candidates and non-overlapping CCEs defined in NR Release 15 may be reused. Based on TS38.213, a common search space (CSS) set has a higher priority than a USS set and a USS set with a lower search space (SS) set index, or search space ID, has a higher priority. In this disclosure, the terms "index" and "identification number" may be used interchangeably, and may be represented as "ID". The mapping/dropping priority for the joint search space set, which may consist of multiple component search space sets, may be defined accordingly. The same mapping/dropping behavior may be applied for multiple component search space sets since they are used for monitoring and detecting one DCI. Furthermore, the link quality may not be so robust for PDCCH transmission and high aggregation level may be used for transmission. The joint search set may have a higher priority for mapping/dropping compared with other normal UE specific search space sets. The following principles, i.e. priority mapping rules, may be used to determine mapping/dropping priority for the joint search space set:

1) the joint search space set has a higher priority than normal UE specific search space sets, yet a lower priority than common search space sets; or alternatively
2) the priority for joint search space set is determined based on the minimum component search space ID or the anchor search space ID.

In the example shown in FIG. 5, a UE is configured with eight search space sets, which include four common search space sets (namely, search space set 0-3, 502a, 502b, 502c and 502d in common search space (CSS) sets 502), and four UE specific search space sets (namely, search space set 4-7, 504a, 504b, 504c and 504d in UE specific search space (USS) sets 504).

In this example, for the UE specific search sets 504, there is one joint search space set 510, e.g., joint search space set 4, and two other normal search space sets, e.g., search space set 5 504c and search space set 7 504d. The joint search space set 4 consists of component search space set 4 and component search space set 6. The component search space set 4 504a is an anchor search space set, and the component search space set 6 504b is an associated search space set. The search space set 6 is associated with the anchor search space set 4.

In principle 1), the joint search space set 4 504a will be mapped after common search space sets 0-3 if the total number of monitored PDCCH candidates or non-overlapping CCEs including common search space sets is not more than the maximum supported number of candidates or non-overlapping CCEs. The search space sets 4 and 6 have the same priority and the priority is higher than that of search space sets 5 and 7. Here, a higher mapping priority is set for the joint search space set than that for other UE specific search space sets. Thus, the final mapping priority is in the order: joint search space set 4 (including component search space set 4 and component search space set 6)>search space set 5>search space set 7 for the UE specific search space sets. If the remaining number of monitored PDCCH candidates or non-overlapping CCEs is not enough for both search space sets 4 and 6, but enough for one search space set, e.g., search space set 4, possible options may include:
a) NOT mapping search space set 4 or 6. That is, both the search space sets 4 and 6 are not mapped. This may be used for the case of always joint decoding.
b) Only mapping anchor space set 4 but NOT mapping search space set 6. This may be used for the case of possible separate/independent decoding.

In principle 2), the joint search space set 4 as a whole is considered as a normal search space set and thus the mapping priority is determined based on the joint search space ID. Since there are two component search space IDs in the joint search space set, according to principle 2, the mapping priority for the joint search space may be determined based on the anchor search space ID or the minimum component search space ID, i.e., search space set 4 in FIG. 5. Here, the ID of the joint search space if configured (e.g., joint search space set 4) for the joint search space set may be determined based on the ID of the anchor search space or the minimum component search space ID (i.e., the smallest ID of the component search space sets). Thus, the final mapping priority is in the order: joint search space set 4 (including component search space set 4 and component search space set 6)>search space set 5>search space set 7. Similar mapping schemes as that defined in principle 1) may be applied for component search space sets 4 and 6. Here, a higher priority is associated with a search space set having a smaller ID among a list of search space IDs, and the list of search space IDs includes the ID of the joint search space set and does not include any ID of the component search space sets individually.

Figure 6:
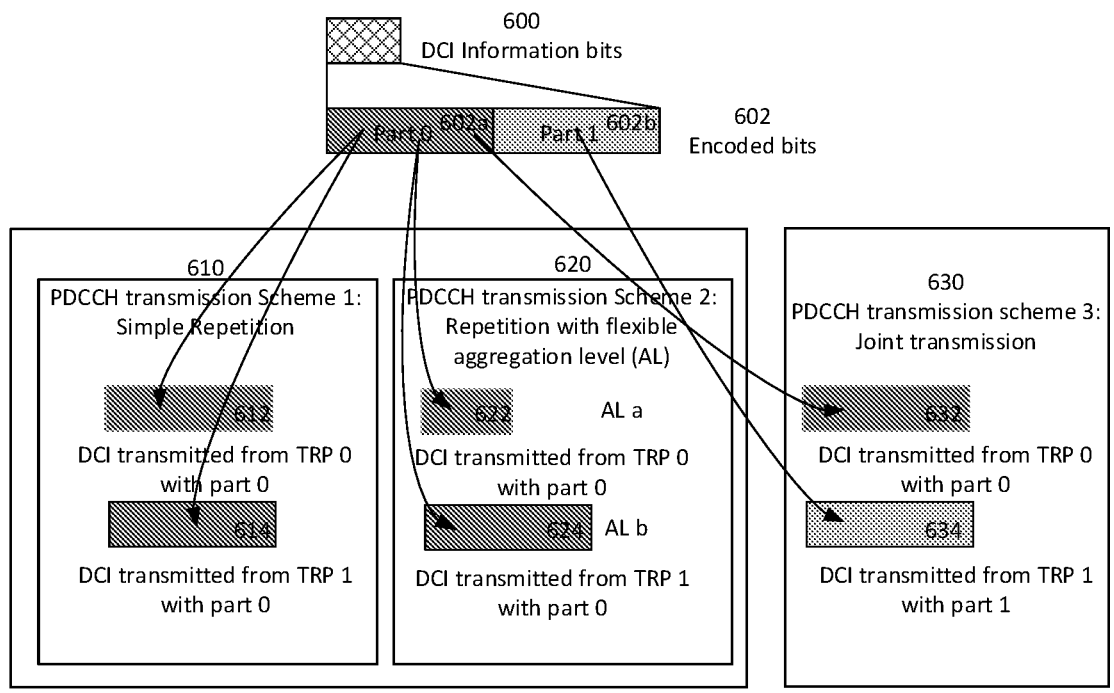
FIG. 6 is a schematic diagram illustrating examples of PDCCH transmission schemes with multiple TRPs in accordance with some implementations of the present disclosure.

FIG. 6 is a schematic diagram illustrating examples of PDCCH transmission schemes with multiple TRPs. There are multiple possible transmission schemes for PDCCH transmission from multiple TRPs. Several exemplary PDCCH transmission schemes are shown in FIG. 6, where transmission for variable DCI versions is considered. The versions of DCI may include: a simple repetition, a part of polar encoding bits, and/or a partial repetition based on an aggregation level of a corresponding TRP. In this example, the DCI information bits 600 is encoded into two parts of encoded bits 602, namely part 0 602a and part 1 602b.

a. For PDCCH transmission scheme 1 610, the simple repetition is used. The same time-frequency resource is used for DCI transmission from multiple TRPs. For example, DCI version 612 may be transmitted from TRP 0 with part 0, and DCI version 614 may be transmitted from TRP 1 with part 0.
b. For PDCCH transmission scheme 2 620, it is a simple extension of scheme 1, which may be referred to as repetition with flexible aggregation level. The time-frequency resources for each search space set is determined by the aggregation level which may be adaptively changed according to the channel quality and system PDCCH load. For example, DCI version 622 may be transmitted from TRP 0 with part 0 of aggregation level a (i.e. AL a), and DCI version 624 may be transmitted from TRP 1 with part 0 of aggregation level b (i.e. AL b).
c. For PDCCH transmission scheme 3 630, different parts of encoded bits are transmitted from different TRPs, which may be referred to as joint transmission. For example, DCI version 632 may be transmitted from TRP 0 with part 0, and DCI version 634 may be transmitted from TRP 1 with part 1.

To be compatible with these PDCCH transmission schemes, several UE decoding behaviors for the joint search space set may be defined as follows:
a. UE decoding behavior 1: UE detects each component search space set independently;
b. UE decoding behavior 2: UE detects each component search space set independently and skips the later component search space sets when it detects a DCI in one component search space set; or c. UE decoding behavior 3: UE makes joint decoding for all the component search space sets.

One of the UE decoding behaviors 1, 2, or 3, may be used depending on gNB configuration based on reported capability of the UE.

For UE decoding behavior 1, it achieves diversity gain in the spatial domain with moderate decoding complexity. It can serve as a decoding behavior for normal requirement. It may be used for PDCCH transmission scheme 1 and 2.

For UE decoding behavior 2, it has the lowest decoding complexity and the shortest delay. Thus, it has relatively low latency and low detection complexity, and thus may be used for special requirement, e.g. fast feedback or power saving. It may be used for PDCCH transmission scheme 1 and 2.

For UE decoding behavior 3, it has the best performance, i.e., achieving the largest channel coding gain, such as the repetition gain or Polar coding gain. In addition, ACK/NACK feedback time is fixed, and thus it is friendly for system realization. However, it has the highest decoding complexity and feedback delay. Since it has the best performance and the largest complexity, UE decoding behavior 3 may be used for UE with the worse channel quality or high reliability requirement. It is more suitable for PDCCH transmission scheme 3 where transmission with multiple DCI versions is specifically designed and may be considered as transmission with lower code rate polar coding.

In summary, different UE decoding behaviors may be selected according to different requirements and UE capability, and the UE decoding behavior may match with the PDCCH transmission scheme. To make alignment on decoding behavior between gNB and UE sides for the joint search space, the gNB may transmit a signaling to the UE to configure the UE with one of the decoding behaviors based on requirement and UE reported capability.

Figure 7A:
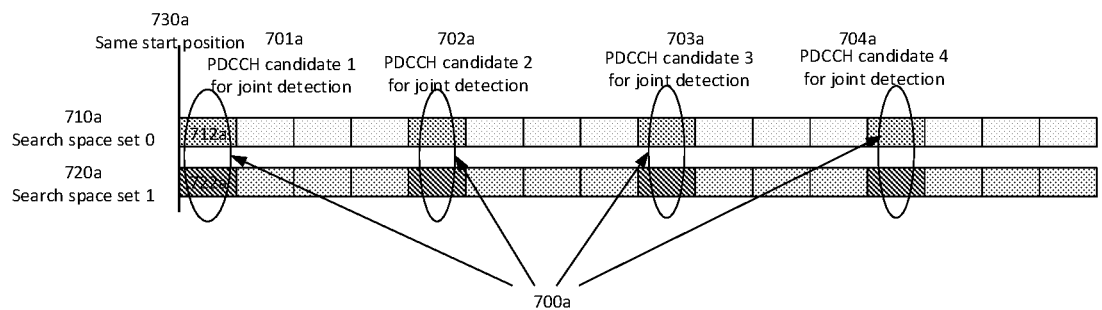
FIG. 7A is a schematic diagram illustrating an example of one-to-one mapping between candidates from component search space sets with a same aggregation level in accordance with some implementations of the present disclosure.
Figure 7B:
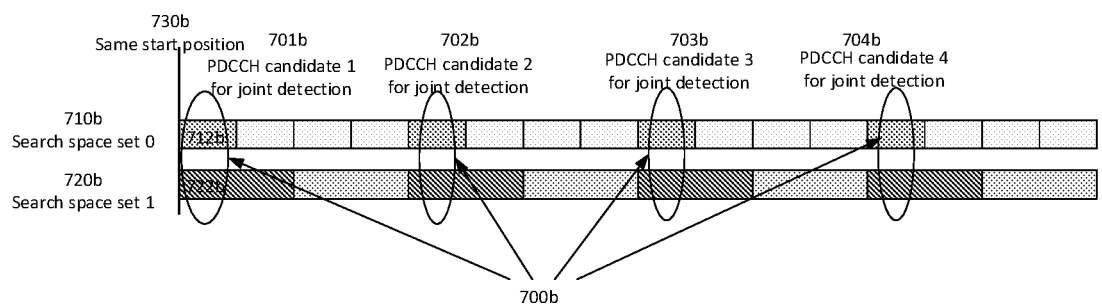
FIG. 7B is a schematic diagram illustrating an example of one-to-one mapping between candidates from component search space sets with different aggregation levels in accordance with some implementations of the present disclosure.

FIG. 7A is a schematic diagram illustrating an example of one-to-one mapping between candidates from component search space sets with the same aggregation level. FIG. 7B is a schematic diagram illustrating an example of one-to-one mapping between candidates from component search space sets with different aggregation levels. The total receiving complexity for a joint search space set is related with channel estimation complexity, which is determined by non-overlapped CCE number, and blind detection complexity, which is determined by the monitored candidate number.

For each component search space set, total candidate number for blind detection is determined by the supported aggregation levels and candidates for each supported aggregation level. For joint search space set, the candidate number increases remarkably since there are many ways of combination between candidates of component search space sets. For example, if the candidate number for one component search space set is 44, the total blind detection number for a joint search space set having two component search space sets is 1936 (i.e. 44*44) without any restriction. Thus, certain restriction for candidate combination is necessary to reduce blind detection complexity.

To well match transmission schemes with one PDCCH transmitted from multiple TRP, one-to-one mapping between candidates from component search space sets may be defined. In detail, candidates for joint blind detection may have overlapped time-frequency resources but come from different CORESETs from TRPs. In this view, the time-domain monitor configuration may be the same for the component search space sets. To guarantee spatial division multiplexing, the same start position for each component search space set is required. According to TS 38.213, different parameters for Hash function may be used for different CORESETs. In detail, $Y_{p,n_{s,f}^\mu} = (A_p \cdot Y_{p,n_{s,f}^\mu - 1}) \mod D$, $Y_{p,-1} = n_{RNTI} \neq 0$, $A_p = 39827$ for pmod3=0, $A_p = 39829$ for pmod3=1, $A_p = 39839$ for pmod3=2, and D=65537, where p denotes the CORESET index and $Y_{p,n_{s,f}^\mu}$ denotes the start position. Thus, if this is applied to the joint search space set, it will randomize the start position for different component search space sets in the joint search space set, which is not desirable. Therefore, one common parameter for Hash function may be used for all the component search space sets. One simple scheme is that the common parameter for Hash function is determined based on the CORESET index associated with the anchor search space set. Alternatively, it may be determined based on the CORESET index associated with the component search space set with the lowest ID, or the CORESET index associated with the joint search space set.

In addition to the use of a common parameter for Hash function, the same number of PDCCH candidates for joint detection is configured for each component search space set. In detail, for cases of simple repetition or joint transmission (PDCCH transmission schemes 1 and 3), the aggregation level and the corresponding candidate number are configured as the same for multiple component search space sets. Then, one-to-one mapping between candidates from component search space sets may be used for joint detection to reduce the total candidate number, and thus decoding complexity. In this disclosure, the terms "joint detection" and "joint decoding" may be used interchangeably unless specified otherwise.

In the example shown in FIG. 7A, a joint search space includes search space set 0 710a and search space set 1 720a. The PDCCH candidates for joint detection include PDCCH candidate 1 701a, PDCCH candidate 2 702a, PDCCH candidate 3 703a, and PDCCH candidate 4 704a. The joint candidate 1 701a, for example, may include two sub-candidates 712a and 722a transmitted from the same time-frequency resource from different TRPs. In the example shown in FIG. 7B, a joint search space include search space set 0 710b and search space set 1 720b. The PDCCH candidates for joint detection 700b include PDCCH candidate 1 701b, PDCCH candidate 2 702b, PDCCH candidate 3 703b, and PDCCH candidate 4 704b. The joint candidate 1 701b, for example, may include two sub-candidates 712b and 722b transmitted from partial overlapped time-frequency resources from different TRPs.

In both examples, a same start position 730a and 730b may be derived by the same Hash function parameter. A one-to-one mapping between candidates from two component search space sets is provided.

As shown in FIG. 7A, for PDCCH candidates 700a, joint detection corresponding to one aggregation level may be performed, where the same time-frequency resource and one-to-one mapping are used for candidates from two component search space sets.

For the case of repetition with adaptive or flexible aggregation level, the aggregation level for each component search space set may be jointly determined and configured. For example, it may be (2, 2), (2, 4), (4, 4), (4, 8), (8, 8), (8, 16), (16, 16), where the first number denotes the aggregation level for the first component search space set and the second number denotes the aggregation level for the second component search space set. For one joint configured aggregation level, the candidate number is configured as the same value for component search space sets. For example, it may be one value from the set {0, 1, 2, 3, 4, 5, 6, 8}. Then, one-to-one mapping between candidates with different aggregation levels from component search space sets may be used for joint detection to reduce the total candidate number and thus decoding complexity.

As shown in FIG. 7B, for PDCCH candidates 700b, joint detection with flexible aggregation level for each candidate may be performed, where partial overlapped time-frequency resources and one-to-one mapping are used for candidates from two component search space sets.

Figure 8:
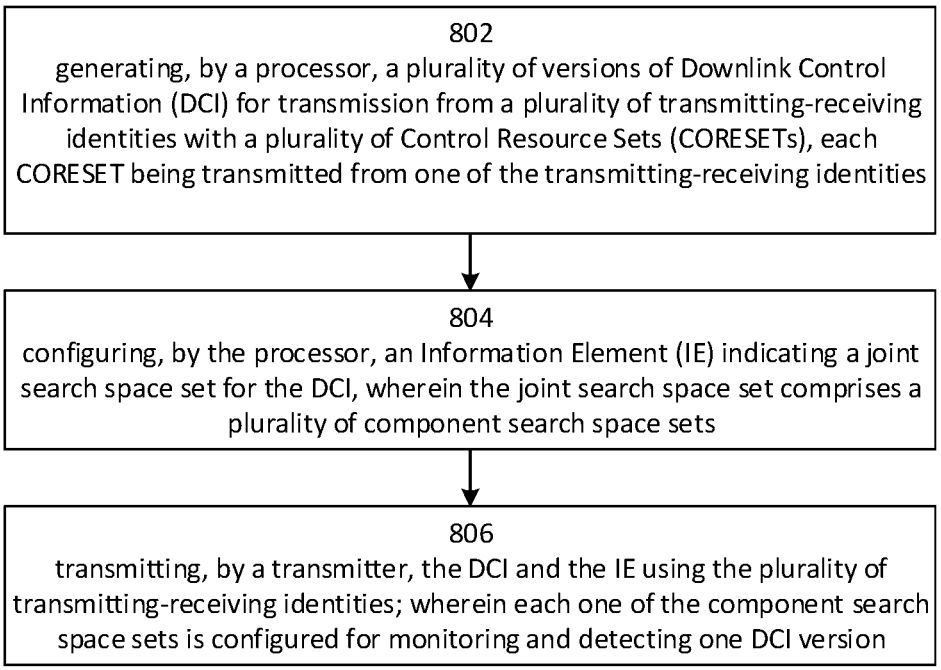
FIG. 8 is a flow chart illustrating steps of transmission of enhanced PDCCH with multiple beams from multiple TRPs with a joint search space set by NE in accordance with some implementations of the present disclosure.

FIG. 8 is a flow chart illustrating steps of transmission of enhanced PDCCH with multiple beams from multiple TRPs with a joint search space set by NE in accordance with some implementations of the present disclosure.

At step 802, the processor 302 of the NE 300 generates a plurality of versions of Downlink Control Information (DCI) for transmission from a plurality of transmitting-receiving identities (e.g., TRPs) with a plurality of Control Resource Sets (CORESETs), each CORESET being transmitted from one of the transmitting-receiving identities.

At step 804, the processor 302 configures an Information Element (IE) indicating a joint search space set for the DCI, wherein the joint search space set comprises a plurality of component search space sets.

At step 806, the transmitter 314 of the NE 300 transmits the DCI and the IE using the plurality of transmitting-receiving identities; where each one of the component search space sets is configured for monitoring and detecting one DCI version.

Figure 9:
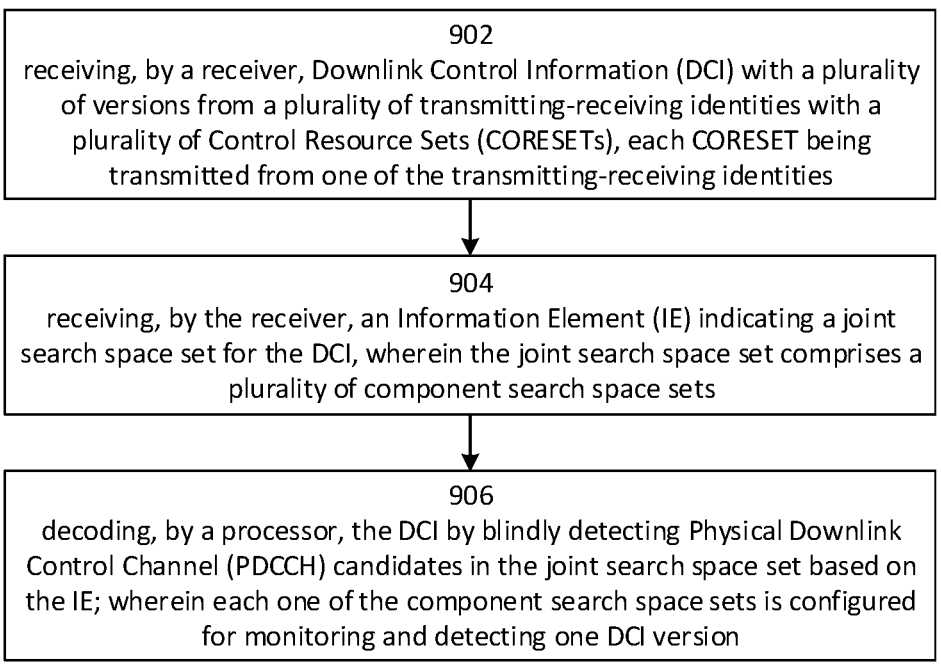
FIG. 9 is a flow chart illustrating steps of reception of enhanced PDCCH with multiple beams from multiple TRPs with a joint search space set by UE in accordance with some implementations of the present disclosure.

FIG. 9 is a flow chart illustrating steps of reception of enhanced PDCCH with multiple beams from multiple TRPs with a joint search space set by UE in accordance with some implementations of the present disclosure.

At step 902, the receiver 214 of the UE 200 receives Downlink Control Information (DCI) with a plurality of versions from a plurality of transmitting-receiving identities with a plurality of Control Resource Sets (CORESETs), each CORESET being transmitted from one of the transmitting-receiving identities.

At step 904, the receiver 214 receives an Information Element (IE) indicating a joint search space set for the DCI, wherein the joint search space set comprises a plurality of component search space sets.

At step 906, the processor 202 of the UE 200 decodes the DCI by blindly detecting Physical Downlink Control Channel (PDCCH) candidates in the joint search space set based on the IE; where each one of the component search space sets is configured for monitoring and detecting one DCI version.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A network equipment (NE) for wireless communication, comprising:
    at least one memory; and
    at least one processor coupled with the at least one memory and configured to cause the NE to:
        generate a plurality of versions of downlink control information (DCI) for transmission from a plurality of transmitting-receiving points with a plurality of control resource sets (CORESETs), each CORESET usable for the transmission of a DCI version from the plurality of transmitting-receiving points, wherein the plurality of versions of DCI comprise one or more of a simple repetition, a part of polar encoding bits, or a partial repetition based on an aggregation level of a respective transmitting-receiving point;
        configure an information element (IE) indicating a joint search space set for the DCI, wherein the joint search space set comprises a plurality of component search space sets each configured for monitoring and detecting the DCI version;
        transmit the DCI with the plurality of versions using the plurality of transmitting-receiving points; and
        transmit the IE.

2. The NE of claim 1, wherein the plurality of component search space sets comprises an anchor search space set and an associated search space set, and the IE is configured for the anchor search space set and includes an identification number (ID) of the associated search space set.

3. The NE of claim 2, wherein the IE includes an ID of the joint search space set, the ID of the joint search space set being an ID of the anchor search space set, or a specifically assigned ID.

4. The NE of claim 1, wherein a priority mapping rule for monitored physical downlink control channel (PDCCH) candidates and non-overlapping control channel elements (CCEs) is defined for the joint search space set, and a higher mapping priority is set for the joint search space set than that for other user equipment (UE) specific search space sets.

5. The NE of claim 4, wherein the priority mapping rule for the monitored PDCCH candidates and the non-overlapping CCEs is defined for the joint search space set, based on a higher priority being associated with a search space set having a smaller ID among a list of search space IDs, and wherein the list of search space IDs includes an ID of the joint search space set and does not include any ID of the component search space sets individually.

6. The NE of claim 5, wherein the ID of the joint search space set is determined based on an ID of an anchor search space set or a smallest ID of the component search space sets.

7. The NE of claim 1, wherein a one-to-one mapping rule between two of the component search space sets is predefined or preconfigured for physical downlink control channel (PDCCH) candidates to reduce joint detection complexity.

8. The NE of claim 1, wherein the at least one processor is configured to cause the NE to transmit a signaling to configure a receiving device to at least one of:
    detect each one of the component search space sets independently;

detect each one of the component search space sets independently, and skip later component search space sets upon detection of the DCI in an earlier component search space set; or perform a joint detection for all of the component search space sets.

9. A user equipment (UE) for wireless communication, comprising:

at least one memory; and at least one processor coupled with the at least one memory and configured to cause the UE to:

receive downlink control information (DCI) with a plurality of versions from a plurality of transmitting-receiving points with a plurality of control resource sets (CORESETs), each CORESET usable for a transmission from one of the transmitting-receiving points, wherein the plurality of versions of DCI comprise one or more of a simple repetition, a part of polar encoding bits, or a partial repetition based on an aggregation level of a respective transmitting-receiving point;

receive an information element (IE) indicating a joint search space set for the DCI, wherein the joint search space set comprises a plurality of component search space sets each configured for monitoring and detecting the DCI version; and decode the DCI by blindly detecting physical downlink control channel (PDCCH) candidates in the joint search space set based on the IE.

10. The UE of claim 9, wherein the plurality of component search space sets comprises an anchor search space set and an associated search space set, and the IE is configured for the anchor search space set and includes an identification number (ID) of the associated search space set.

11. The UE of claim 10, wherein the IE includes an ID of the joint search space set, the ID of the joint search space set being an ID of the anchor search space set, or a specifically assigned ID.

12. The UE of claim 9, wherein a priority mapping rule for monitored physical downlink control channel (PDCCH) candidates and non-overlapping control channel elements (CCEs) is defined for the joint search space set and a higher mapping priority is set for the joint search space set than that for other UE specific search space sets.

13. The UE of claim 12, wherein the priority mapping rule for the monitored PDCCH candidates and the non-overlapping CCEs is defined for the joint search space set, based on a higher priority being associated with a search space set having a smaller ID among a list of search space IDs, and wherein the list of search space IDs includes an ID of the joint search space set and does not include any ID of the component search space sets individually.

14. The UE of claim 13, wherein the ID of the joint search space set is determined based on an ID of an anchor search space set or a smallest ID of the component search space sets.

15. The UE of claim 9, wherein a one-to-one mapping rule between two of the component search space sets is predefined or preconfigured for the PDCCH candidates.

16. The UE of claim 9, wherein the at least one processor is configured to cause the UE to receive a signaling from a transmitting device for configuring the UE to perform at least one of:

detect each one of the component search space sets independently;

detect each one of the component search space sets independently, and skip later component search space sets upon detection of the DCI in an earlier component search space set; or perform a joint detection for all of the component search space sets.

17. A method performed by a network equipment (NE), the method comprising:

generating a plurality of versions of downlink control information (DCI) for transmission from a plurality of transmitting-receiving points with a plurality of control resource sets (CORESETs), each CORESET being used for the transmission of a DCI version from the plurality of transmitting-receiving points, wherein the plurality of versions of DCI comprise one or more of a simple repetition, a part of polar encoding bits, or a partial repetition based on an aggregation level of a respective transmitting-receiving point;

configuring an information element (IE) indicating a joint search space set for the DCI, wherein the joint search space set comprises a plurality of component search space sets each configured for monitoring and detecting the DCI version;

transmitting the DCI with the plurality of versions using the plurality of transmitting-receiving points; and transmitting the IE.

18. The method of claim 17, wherein the plurality of component search space sets comprises an anchor search space set and an associated search space set, and the IE is configured for the anchor search space set and includes an identification number (ID) of the associated search space set.

19. The method of claim 18, wherein the IE includes an ID of the joint search space set, the ID of the joint search space set being an ID of the anchor search space set, or a specifically assigned ID.

20. A processor for wireless communication, comprising:

at least one controller coupled with at least one memory and configured to cause the processor to:

receive downlink control information (DCI) with a plurality of versions from a plurality of transmitting-receiving points with a plurality of control resource sets (CORESETs), each CORESET usable for a transmission from one of the transmitting-receiving points, wherein the plurality of versions of DCI comprise one or more of a simple repetition, a part of polar encoding bits, or a partial repetition based on an aggregation level of a respective transmitting-receiving point;

receive an information element (IE) indicating a joint search space set for the DCI, wherein the joint search space set comprises a plurality of component search space sets each configured for monitoring and detecting the DCI version; and decode the DCI by blindly detecting physical downlink control channel (PDCCH) candidates in the joint search space set based on the IE.

* * * * *